United States Patent
Hamaoka et al.

(10) Patent No.: US 11,245,487 B2
(45) Date of Patent: Feb. 8, 2022

(54) OPTICAL TRANSMISSION CONTROL METHOD AND OPTICAL TRANSMISSION SYSTEM

(71) Applicant: NIPPON TELEGRAPH AND TELEPHONE CORPORATION, Tokyo (JP)

(72) Inventors: Fukutaro Hamaoka, Tokyo (JP); Kyo Minoguchi, Tokyo (JP); Seiji Okamoto, Tokyo (JP); Yoshiaki Kisaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/059,238

(22) PCT Filed: May 20, 2019

(86) PCT No.: PCT/JP2019/019926
§ 371 (c)(1),
(2) Date: Nov. 26, 2020

(87) PCT Pub. No.: WO2019/230480
PCT Pub. Date: Dec. 5, 2019

(65) Prior Publication Data
US 2021/0211218 A1    Jul. 8, 2021

(30) Foreign Application Priority Data
May 31, 2018  (JP) .............................. JP2018-105097

(51) Int. Cl.
*H04J 14/02*    (2006.01)
*H04B 10/2537*  (2013.01)
*H04B 10/548*   (2013.01)

(52) U.S. Cl.
CPC ...... *H04J 14/0205* (2013.01); *H04B 10/2537* (2013.01); *H04B 10/548* (2013.01)

(58) Field of Classification Search
None
See application file for complete search history.

(56) References Cited

U.S. PATENT DOCUMENTS
2002/0181061  A1*  12/2002  Uda ................... H04J 14/0221
                                                         398/141

FOREIGN PATENT DOCUMENTS
JP         2002368691 A      12/2002

OTHER PUBLICATIONS

S. Okamoto et al., 5-band (O,E,S,C and L) WDM Transmission with Wavelength Adaptive Modulation Format Allocation, ECOC 2016—42nd European Conference and Exhibition on Optical Communications, Sep. 2016, pp. 1172 to 1174.

(Continued)

*Primary Examiner* — David W Lambert
(74) *Attorney, Agent, or Firm* — Harness, Dickey & Pierce, P.L.C.

(57) ABSTRACT

An optical transmission system includes an optical transmitter, an optical receiver, and a control apparatus. The control apparatus repeatedly performs an adjustment process for adjusting power of an optical signal of a frequency band to be adjusted while switching the frequency band to be adjusted between at least two frequency bands including at least a frequency band where stimulated Raman scattering occurs among frequency bands that are multiplexed in a multiplexed optical signal transmitted by the optical transmission system. In the adjustment process, when power of an optical signal of the frequency band to be adjusted transmitted from the optical transmitter has been changed, the control apparatus determines the power of the optical (Continued)

signal of the frequency band to be adjusted on the basis of a signal quality measured by the optical receiver that has received the optical signal.

6 Claims, 4 Drawing Sheets

(56) References Cited

OTHER PUBLICATIONS

J. Renaudier et al., First 100-nm Continuous-Band WDM Transmission System with 115Tb/s Transport over 100km Using Novel Ultra-Wideband Semiconductor Optical Amplifiers, 2017 ECOC, Sep. 2017.
K. Minoguchi et al., Experiments on Stimulated Raman Scattering in S- and L-bands 16-QAM Signals for Ultra-Wideband Coherent WDM Systems, OFC, 2018, Th1C.4.

* cited by examiner

OPTICAL TRANSMISSION CONTROL METHOD AND OPTICAL TRANSMISSION SYSTEM

CROSS-REFERENCE TO RELATED APPLICATIONS

This application is a 371 National Stage of International Application No. PCT/JP2019/019926 filed on May 20, 2019, which claims priority to Japanese Patent Application No. 2018-105097, filed May 31, 2018. The entire disclosures of the above applications are incorporated herein by reference.

TECHNICAL FIELD

The present invention relates to an optical transmission control method and an optical transmission system.

BACKGROUND ART

Expansion of the bandwidth of wavelength division multiplexing (WDM) to increase the capacity of an optical transmission system has been discussed (for example, see Non-Patent Literature 1). An optical transmission system of the related art uses single-band transmission of the C-band (1530 to 1565 nm) or the L-band (1565 to 1625 nm) or uses two-band transmission using the C- and L-bands. Three-band transmission using the S-band (1460 to 1530 nm) in addition to the two bands has been studied in recent years (for example, see Non Patent Literatures 2 and 3).

CITATION LIST

Non Patent Literature

Non-Patent Literature 1: Seiji Okamoto et al., "5-band (O, E, S, C, and L) WDM Transmission with Wavelength Adaptive Modulation Format Allocation", ECOC 2016-42nd European Conference and Exhibition on Optical Communications, September 2016, pp. 1172-1174

Non-Patent Literature 2: J. Renaudier et al., "First 100-nm Continuous-Band WDM Transmission System with 115 Tb/s Transport over 100 km Using Novel Ultra-Wideband Semiconductor Optical Amplifiers", 2017 European Conference on Optical Communication (ECOC), September 2017

Non-Patent Literature 3: K. Minoguchi et al., "Experiments on Stimulated Raman Scattering in S- and L-bands 16-QAM Signals for Ultra-Wideband Coherent WDM Systems", Optical Fiber Communication Conference (OFC) 2018, March 2018, Th1C.4

SUMMARY OF THE INVENTION

Technical Problem

In ultra-wideband WDM transmission, transfer of signal power occurs between WDM signal bands due to stimulated Raman scattering during optical fiber transmission (for example, see Non-Patent Literature 3). For example, when the signal bands of the S-, C-, and L-bands described above are used with a general single-mode fiber used for optical communication, signal power is transferred between signals having a wavelength difference of about 100 nm (a frequency difference of 13.2 THz), from the short wavelength side to the long wavelength side. That is, in the case of three-band transmission, WDM signal power of the S-band is transferred to the L-band.

In view of the above circumstances, it is an object of the present invention to provide an optical transmission control method and a transmission system that can appropriately adjust the power of an optical signal of each frequency band overlapped in a wavelength division multiplexed signal.

Means for Solving the Problem

An aspect of the present invention provides an optical transmission control method including an adjustment step of repeatedly performing an adjustment process for adjusting power of an optical signal of a frequency band to be adjusted while switching the frequency band to be adjusted between at least two frequency bands including at least a frequency band where stimulated Raman scattering occurs among frequency bands that are multiplexed in a multiplexed optical signal transmitted by an optical transmission system.

An aspect of the present invention provides the above optical transmission control method, wherein the optical transmission system includes an optical transmitter that transmits an optical signal to be multiplexed in the multiplexed optical signal and an optical receiver that receives an optical signal into which the multiplexed optical signal is demultiplexed, and the adjustment process includes, when power of an optical signal of the frequency band to be adjusted transmitted from the optical transmitter has been changed, determining the power of the optical signal of the frequency band to be adjusted on the basis of a signal quality measured by the optical receiver that has received the optical signal.

An aspect of the present invention provides the above optical transmission control method, wherein the adjustment step includes performing the adjustment process on a plurality of the frequency bands excluding the frequency band where stimulated Raman scattering does not occur, using the plurality of frequency bands as frequency bands to be adjusted.

An aspect of the present invention provides the above optical transmission control method, wherein the adjustment step includes causing the optical transmission system to transmit an optical signal of only one of the frequency bands to perform the adjustment process and determining an initial value of power of an optical signal of the one of the frequency bands.

An aspect of the present invention provides an optical transmission system for transmitting a multiplexed optical signal, the optical transmission system including a controller that repeatedly performs an adjustment process for adjusting power of an optical signal of a frequency band to be adjusted while switching the frequency band to be adjusted between at least two frequency bands including at least a frequency band where stimulated Raman scattering occurs among frequency bands that are multiplexed in the multiplexed optical signal transmitted by the optical transmission system.

Effects of the Invention

According to the present invention, it is possible to appropriately adjust the power of an optical signal of each frequency band overlapped in a wavelength division multiplexed signal.

DESCRIPTION OF EMBODIMENTS

Hereinafter, embodiments of the present invention will be described in detail with reference to the drawings. In the present embodiment, the input power of an optical signal of each frequency band to an optical fiber transmission line is optimized under a WDM optical fiber transmission condition where stimulated Raman scattering occurs.

Extending the frequency bandwidth for multiplexing, such as using a plurality of frequency bands such as C- and L-bands in one optical transmission system, to increase the capacity of communication causes stimulated Raman scattering with optical power transferred from the short wavelength side to the long wavelength side. Here, it suffices to simply increase the power on the short wavelength side because stimulated Raman scattering is a phenomenon in which power is transferred to the long wavelength side. However, increasing the power on the short wavelength side deteriorates signal characteristics on the short wavelength side due to another nonlinear optical effect (self-phase modulation or cross-phase modulation). This causes the power of each frequency band to vary during transmission such that it does not become the intended power. Thus, an optical transmission system of the present embodiment repeatedly performs a process of optimizing each frequency band until the signal quality converges.

In the optimization process, a control apparatus that cooperatively controls optical transmitters and optical receivers causes the power of optical signals of each frequency band transmitted from the optical transmitters to be changed, the optical receivers synchronously detect the signal quality such as a BER and a Q value, and the control apparatus determines optimal power. For example, the optical transmission system according to the embodiment repeats a procedure of performing an optimization process on a first frequency band and then performing an optimization process on a second frequency band where stimulated Raman scattering occurs with respect to the first frequency band until the signal qualities of the first and second frequency bands converge. This method allows the optical transmission system to easily determine an optimal value with the nonlinear optical effect included and optimize input power to the optical fiber transmission line even when wavelengths of a wideband where stimulated Raman scattering occurs are used in the single optical transmission system.

Figure 1:
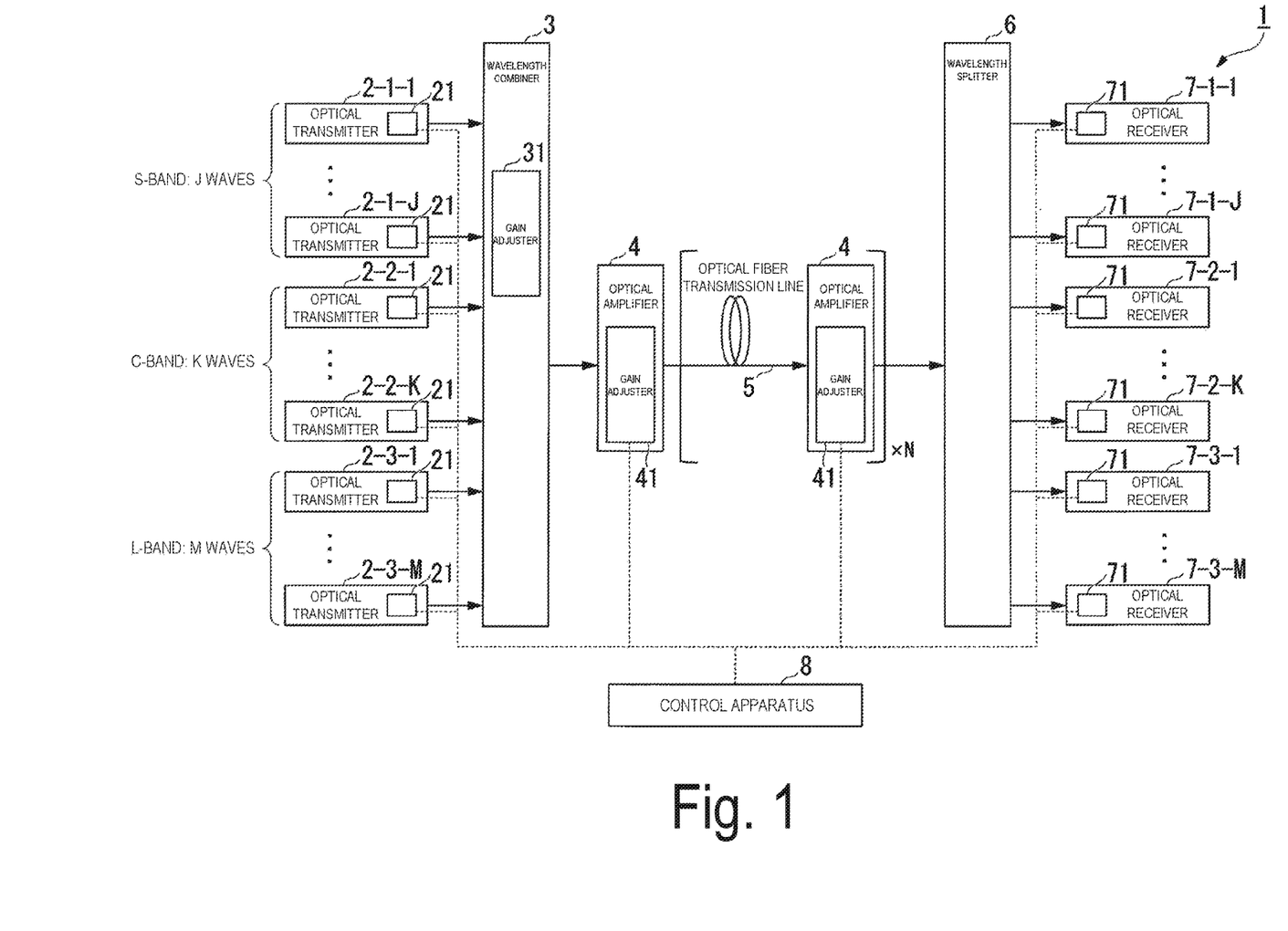
FIG. 1 is a diagram illustrating an exemplary configuration of an optical transmission system according to an embodiment of the present invention.

FIG. 1 is a diagram illustrating an exemplary configuration of an optical transmission system 1 according to an embodiment of the present invention. The optical transmission system 1 uses at least two frequency bands where stimulated Raman scattering occurs. Hereinafter, a frequency band is also referred to as a band. Stimulated Raman scattering occurs in a general silica fiber when there is a wavelength difference of about 100 nm. Here, the optical transmission system 1 performs wavelength division multiplexing transmission of optical signals of J waves in the S-band (where J is an integer of 1 or more), optical signals of K waves in the C-band (where K is an integer of 1 or more), and optical signals of M waves in the L-band (where M is an integer of 1 or more). The optical transmission system 1 includes optical transmitters 2, a wavelength combiner (wavelength multiplexer) 3, optical amplifiers 4, a wavelength splitter (wavelength demultiplexer) 6, optical receivers 7, and a control apparatus 8.

A plurality of optical transmitters 2 included in the optical transmission system 1 include optical transmitters 2 for transmitting S-band optical signals, optical transmitters 2 for transmitting C-band optical signals, and optical transmitters 2 for transmitting L-band optical signals. In FIG. 1, J pieces of optical transmitters 2 for transmitting S-band optical signals are referred to as optical transmitters 2-1-1 to 2-1-J, K pieces of optical transmitters for transmitting C-band optical signals are referred to as optical transmitters 2-2-1 to 2-2-K, and M pieces of optical transmitters 2 for transmitting L-band optical signals are referred to as optical transmitters 2-3-1 to 2-3-M. The optical transmitters 2-1-1 to 2-14 transmit optical signals of different wavelengths in the S-band, the optical transmitters 2-2-1 to 2-2-K transmit optical signals of different wavelengths in the C-band, and the optical transmitters 2-3-1 to 2-3-M transmit optical signals of different wavelengths in the L-band.

The wavelength combiner 3 multiplexes optical signals of different wavelengths transmitted by the optical transmitters 2-1-1 to 2-3-M and outputs a wavelength division multiplexed optical signal obtained through the multipexing. 1+N pieces of optical amplifiers 4 (where N is an integer of 0 or more) are inserted between the wavelength combiner 3 and the wavelength splitter 6. Adjacent optical amplifiers 4 are connected by an optical fiber transmission line 5.

Each optical amplifier 4 receives a wavelength division multiplexed optical signal output from the wavelength combiner 3 immediately upstream of the optical amplifier 4 or from another optical amplifier 4 immediately upstream of the optical amplifier 4 as an input, amplifies the received multiplexed optical signal, and outputs the amplified multiplexed optical signal to another optical amplifier 4 immediately downstream of the optical amplifier 4 or to the wavelength splitter 6 immediately downstream of the optical amplifier 4. The wavelength splitter 6 receives a wavelength division multiplexed optical signal output from an optical amplifier 4 immediately upstream of the wavelength splitter 6 as an input, demultiplexes the wavelength division multiplexed optical signal by wavelength into optical signals of wavelengths and outputs the demultiplexed optical signals of the wavelengths to the corresponding optical receivers 7 for receiving optical signals of the wavelengths.

A plurality of optical receivers 7 included in the optical transmission system 1 include optical receivers 7 for receiving S-band optical signals, optical receivers 7 for receiving C-band optical signals, and optical receivers 7 for receiving L-band optical signals. In FIG. 1, J pieces of optical receivers 7 for receiving S-band optical signals are referred to as optical receivers 7-1-1 to 7-1-J, K pieces of optical receivers 7 for receiving C-band optical signals are referred to as optical receivers 7-2-1 to 7-2-K, and M pieces of optical receivers 7 for receiving L-band optical signals are referred to as optical receivers 7-3-1 to 7-3-M. The optical receivers 7-1-1 to 7-1-J receive optical signals of different wavelengths in the S-band, the optical receivers 7-2-1 to 7-2-K receive optical signals of different wavelengths in the C-band, and the optical receivers 7-3-1 to 7-3-M receive optical signals of different wavelengths in the L-band.

By having input power adjuster, the optical transmission system 1 can input optical signals to the optical fiber transmission line 5 with different average input powers in the S-, C-, and L-bands. The input power adjuster includes at least one of optical power adjustment functional units 21 included in the optical transmitters 2, a gain adjuster 31 included in the wavelength combiner 3, and gain adjusters 41 included in the optical amplifiers 4. Each optical power adjustment functional unit 21 has a function of adjusting the power of an optical signal output from an optical transmitter including the optical power adjustment functional unit 21. Each of the gain adjuster 31 and the gain adjusters 41 has a function of performing variable gain adjustment for each band. The optical transmitters 2 may not include the optical power adjustment functional units 21 in a case where the optical transmitters 2 do not perform power adjustment of optical signals, the wavelength combiner 3 may not include the gain adjuster 31 in a case where the wavelength combiner 3 does not perform gain adjustment for each band, and the optical amplifiers 4 may not include the gain adjusters 41 in a case where the optical amplifiers 4 do not perform gain adjustment for each band.

For each of the S-, C-, and L-bands, at least one optical receiver 7 includes a quality measuring unit 71. The quality measuring unit 71 may be provided outside the optical receiver 7, such as between the wavelength splitter and the optical receiver 7. The quality measuring unit 71 measures the signal quality of an optical signal received by the optical receiver including the quality measuring unit 71. The quality measuring unit 71 measures, for example, a bit error rate (BER) or a Q value that can be calculated from the BER as the signal quality. FIG. 1 shows a configuration in which each of the optical receivers 7 includes a quality measuring unit 71. However, a configuration is also possible in which optical receivers 7 for receiving optical signals of representative wavelengths of the bands, such as light of center wavelengths of the bands, each include a quality measuring unit 71 and the other optical receivers 7 each do not include a quality measuring unit 71. In the case where a plurality of optical receivers 7 measure signal qualities in one band, for example, an average of signal qualities measured by quality measuring units 71 of the optical receivers 7 is used as the signal quality of the band. In the case where one quality measuring unit 71 measures a signal quality in one band, a signal quality measured by a quality measuring unit 71 of an optical receiver 7 that receives an optical signal of a representative wavelength of the band is used as the signal quality of the band.

The control apparatus 8 performs a process of optimizing the input power of each band to the optical fiber transmission line 5. Here, the input power of each band to the optical fiber transmission line 5 is an average input power to the optical fiber transmission line 5 in each of the S-band (of J waves), the C-band (of K waves) and the L-band (of M waves). A general method is used for the process of optimizing the input power. For example, the control apparatus 8 raises and lowers the input powers of optical signals transmitted from the optical transmitters 2 to the optical fiber transmission line 5 by controlling the input power adjusters. Further, the control apparatus 8 monitors measurement results of the signal qualities of the optical signals in cooperation with the quality measuring units 71 of the optical receivers 7 and selects input power having the best signal quality.

In the related art, an optical transmitter 2 and an optical receiver 7 at a long distance generally have a function of communicating with each other. The control apparatus 8 may be provided using this function. The optical transmission system of the related art also includes, for example, a monitoring control system such as a network element operations system (NE-OpS). Thus, the control apparatus 8 may be provided by this monitoring control system. Alternatively, the control apparatus 8 may cooperate with the monitoring control system such that it controls the input power adjusters and the quality measuring units 71 via the monitoring control system.

Figure 2:
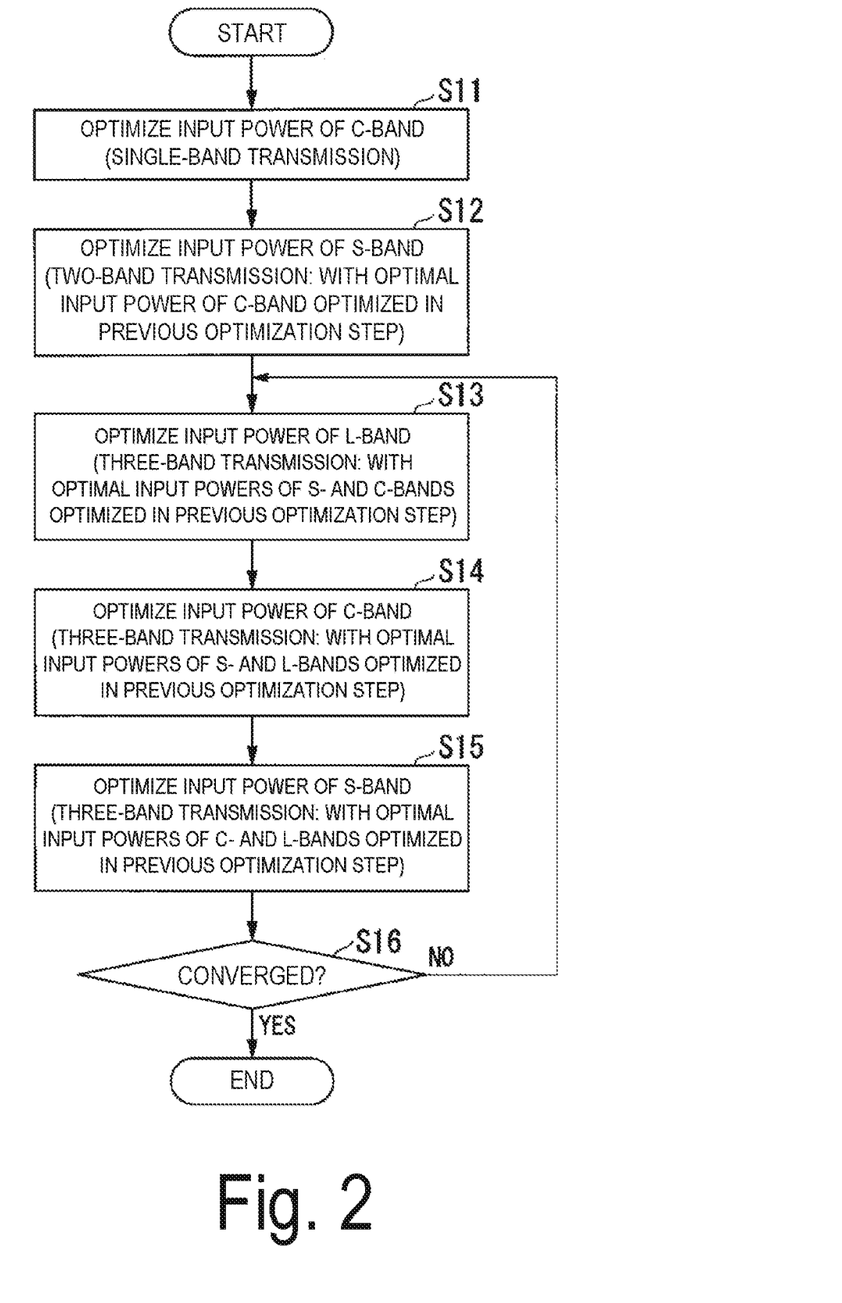
FIG. 2 is a flowchart illustrating a process for optimizing input power to an optical fiber transmission line in the optical transmission system according to the embodiment.

FIG. 2 is a flowchart illustrating a process of optimizing the input power to the optical fiber transmission line in the optical transmission system 1.

First, the optical transmission system 1 performs single-band transmission of the C-band and optimizes the input power of the C-band (step S11). For example, the control apparatus 8 or the monitoring control system instructs the C-band optical transmitters 2-2-1 to 2-2-K to transmit optical signals and instructs the S-band optical transmitters 2-1-1 to 2-1-J and the L-band optical transmitters 2-3-1 to 2-3-M to stop transmitting optical signals. Further, the control apparatus 8 instructs the C-band input power adjuster to change the input power of C-band optical signals. The C-band input power adjuster includes at least one of the optical power adjustment functional units 21 of the C-band optical transmitters 2-2-1 to 2-2-K, the gain adjuster 31 of the wavelength combiner 3, and the gain adjusters 41 of the optical amplifiers 4. The control apparatus 8 receives signal quality measurement results from the quality measuring units 71 of the C-band optical receivers 7 while instructing that the input power of the C-band be changed. The control apparatus 8 selects a C-band input power having the best signal quality.

Next, the optical transmission system 1 performs two-band transmission of the C- and S-bands and optimizes the input power of the S-band (step S12). The control apparatus 8 or the monitoring control system instructs the C-band optical transmitters 2-2-1 to 2-2-K and the S-band optical transmitters 2-1-1 to 2-1-J to transmit optical signals and instructs the L-band optical transmitters 2-3-1 to 2-3-M to stop transmitting optical signals. The control apparatus 8 instructs the C-band input power adjuster to adjust the input power of the C-band to that selected in step S11. Further, the control apparatus 8 instructs the S-band input power adjuster to change the input power of S-band optical signals. The S-band input power adjuster includes at least one of the optical power adjustment functional units 21 of the S-band optical transmitters 2-1-1 to 2-1-J, the gain adjuster 31 of the wavelength combiner 3, and the gain adjusters 41 of the optical amplifiers 4. The control apparatus 8 receives signal quality measurement results from the quality measuring units 71 of the S-band optical receivers 7 and selects an S-band input power having the best signal quality.

Subsequently, the optical transmission system 1 performs a loop process of steps S13 to S16.

First, the optical transmission system 1 performs three-band transmission of the C-, S-, and L-bands and optimizes the input power of the L-band (step S13). Here, when performing three-band transmission, the control apparatus 8 or the monitoring control system instructs optical transmitters 2 that have stopped transmitting optical signals, if any, to transmit optical signals. The control apparatus 8 instructs the C-band input power adjuster to adjust the input power of the C-band to that selected in step S11 and instructs the S-band input power adjuster to adjust the input power of the S-band to that selected in step S12. Further, the control apparatus 8 instructs the L-band input power adjuster to change the input power of L-band optical signals. The L-band input power adjuster includes at least one of the optical power adjustment functional units 21 of the L-band optical transmitters 2-3-1 to 2-3-M, the gain adjuster 31 of the wavelength combiner 3, and the gain adjusters 41 of the optical amplifiers 4. The control apparatus 8 receives signal quality measurement results from the quality measuring units 71 of the L-band optical receivers 7 and selects an L-band input power having the best signal quality.

Next, the optical transmission system 1 optimizes the input power of the C-band while performing three-band transmission of the C-, S-, and L-bands (step S14). The control apparatus 8 instructs the S-band input power adjuster to adjust the input power of the S-band to that selected in step S11 and instructs the L-band input power adjuster to adjust the input power of the L-band to that selected in step S13 of the current loop process. Further, the control apparatus 8 instructs the C-band input power adjuster to change the input power of C-band optical signals and receives signal quality measurement results from the quality measuring units 71 of the C-band optical receivers 7. The control apparatus 8 selects a C-band input power having the best signal quality.

Next, the optical transmission system 1 performs three-band transmission of the C-, S-, and L-bands and optimizes the input power of the S-band (step S15). The control apparatus 8 instructs the C-band input power adjuster to adjust the input power of the C-band to that selected in step S14 of the current loop process and instructs the L-band input power adjuster to adjust the input power of the L-band to that selected in step S13 of the current loop process. Further, the control apparatus 8 instructs the S-band input power adjuster to change the input power of S-band optical signals and receives signal quality measurement results from the quality measuring units 71 of the S-band optical receivers 7. The control apparatus 8 selects an S-band input power having the best signal quality.

The control apparatus 8 determines whether or not the input powers of the S-, C-, and L-bands have converged (step S16). For example, the control apparatus 8 determines that the input powers of the S-, C-, and L-bands have converged when the differences between the input powers of the S-, C-, and L-bands selected in the current loop process and those selected in the previous loop process are all equal to or smaller than a threshold. The threshold may be different for each band. When the control apparatus 8 has determined that the input power of at least one of the S-, C-, and L-bands has not converged (step S16: NO), the optical transmission system 1 repeats the process starting from step S13. In the first loop process, the control apparatus 8 determines that the input powers have not converged because there is no input power of the L-band selected previously.

In step S13 in the second and subsequent loop processes of steps S13 to S16, the control apparatus 8 instructs the C-band input power adjuster to adjust the input power of the C-band to that selected in step S14 of the previous loop process and instructs the S-band input power adjuster to adjust the input power of the S-band to that selected in step S15 of the previous loop process. In step S14, the control apparatus 8 instructs the S-band input power adjuster to adjust the input power of the S-band to that selected in step S15 of the previous loop process.

If the control apparatus 8 determines that the input powers of the S-, C-, and L-bands have all converged (step S16: YES), the process ends. The control apparatus 8 instructs the input power adjusters to adjust the input powers of the S-, C-, and L-bands to those selected in the last loop process.

In the process flow described above, the optical transmission system 1 first optimizes the input power of the C-band in step S11. However, the optical transmission system 1 may first optimize the input power from any of the S-, C-, and L-bands. In this case, in step S12, the optical transmission system 1 may optimize any band other than the band optimized in step S11.

The optical transmission system 1 may perform the process from step S13 with the input powers of the S- and C-bands set to arbitrary values without performing steps S11 and S12.

The C-band is less subject to the effects of stimulated Raman scattering in three-band transmission of the S-, C-, and L-bands. Thus, the process of FIG. 2 can be simplified as shown in FIG. 3.

Figure 3:
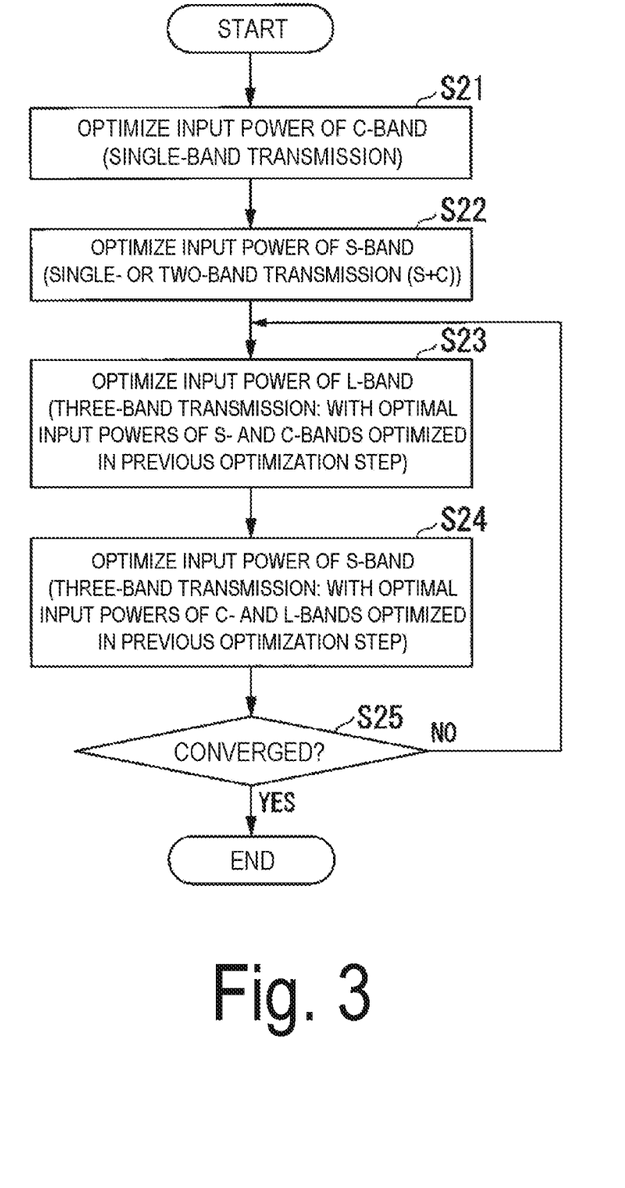
FIG. 3 is a flowchart illustrating another process for optimizing input power to an optical fiber transmission line in the optical transmission system according to the embodiment.

FIG. 3 is a flowchart illustrating another method for the processing of optimizing the input power to the optical fiber transmission line in the optical transmission system 1. First, the optical transmission system 1 performs single-band transmission of the C-band and optimizes the input power of the C-band, similar to step S11 in FIG. 2 (step S21).

Next, the optical transmission system 1 performs single-band transmission of the S-band or two-band transmission of the C- and S-bands and optimizes the input power of the S-band (step S22). When performing single-band transmission of the S-band, the control apparatus 8 or the monitoring control system instructs the S-band optical transmitters 2-1-1 to 2-1-J to transmit optical signals and instructs the C-band optical transmitters 2-2-1 to 2-2-K and the L-band optical transmitters 2-3-1 to 2-3-M to stop transmitting optical signals. When performing two-band transmission of the C- and S-bands, the control apparatus 8 or the monitoring control system instructs the S-band optical transmitters 2-1-1 to 2-1-J and the C-band optical transmitters 2-2-1 to 2-2-K to transmit optical signals and instructs the L-band optical transmitters 2-3-1 to 2-3-M to stop transmitting optical signals. When performing two-band transmission, the control apparatus 8 further instructs the C-band input power adjuster to adjust the input power of the C-band to that selected in step S21. The control apparatus 8 instructs the S-band input power adjuster to change the input power of S-band optical signals and receives signal quality measurement results from the quality measuring units 71 of the S-band optical receivers 7.
The control apparatus 8 selects an S-band input power having the best signal quality.

Subsequently, the optical transmission system 1 performs a loop process of steps S23 to S25.
First, the optical transmission system 1 performs three-band transmission of the C-, S-, and L-bands and optimizes the input power of the L-band (step S23). The control apparatus 8 instructs the C-band input power adjuster to adjust the input power of the C-band to that selected in step S21 and instructs the S-band input power adjuster to adjust the input power of the S-band to that selected in step S22. Further, the control apparatus 8 instructs the L-band input power adjuster to change the input power of L-band optical signals and receives signal quality measurement results from the quality measuring units 71 of the L-band optical receivers 7. The control apparatus 8 selects an L-band input power having the best signal quality.

Next, the optical transmission system 1 performs three-band transmission of the C-, S-, and L-bands and optimizes the input power of the S-band (step S24). The control apparatus 8 instructs the C-band input power adjuster to adjust the input power of the C-band to that selected in step S21 and instructs the L-band input power adjuster to adjust the input power of the L-band to that selected in step S23 of the current loop process. Further, the control apparatus 8 instructs the S-band input power adjuster to change the input power of S-band optical signals and receives signal quality measurement results from the quality measuring units 71 of the S-band optical receivers 7. The control apparatus 8 selects an S-band input power having the best signal quality.

The control apparatus 8 determines whether or not the input powers of the S- and L-bands have converged (step S25). For example, the control apparatus 8 determines that the input powers of the S- and L-bands have converged when the differences between the input powers of the S- and L-bands selected in the current loop process and those selected in the previous loop process are all equal to or smaller than a threshold. The threshold may be different for each band. When the control apparatus 8 has determined that the input power of at least one of the S- and L-bands has not converged (step S25: NO), the optical transmission system 1 repeats the process from step S23. In the first loop process, the control apparatus 8 determines that the input powers have not converged because there is no input power of the L-band selected previously. In step S23 in the second and subsequent loop processes, the control apparatus 8 instructs the S-band input power adjuster to adjust the input power of the S-band to that selected in step S24 of the previous loop process.

If the control apparatus 8 determines that the input powers of the S- and L-bands have both converged (step S25: YES), the process ends. The control apparatus 8 instructs the input power adjusters to adjust the input power of the C-band to that selected in step S21 and the input powers of the S- and L-bands to those selected in the last loop process.

In the process flow of FIG. 3 described above, the optical transmission system 1 optimizes the input power of the S-band in step S22. However, the optical transmission system 1 may optimize the input power of the L-band in step S22. In this case, the optical transmission system 1 optimizes the input power of the S-band in step S23 and optimizes the input power of the L-band in step S24.

The optimization process shown in the process flows of FIGS. 2 and 3 can be performed by one or both of numerical simulation and experiment. For example, the process shown in FIG. 2 or 3 is performed at the time of initial setup when performing wideband transmission using a new transmission line. The optimization process may be performed by the control apparatus or may be performed by a simulator for transmission line design.

Figure 4:
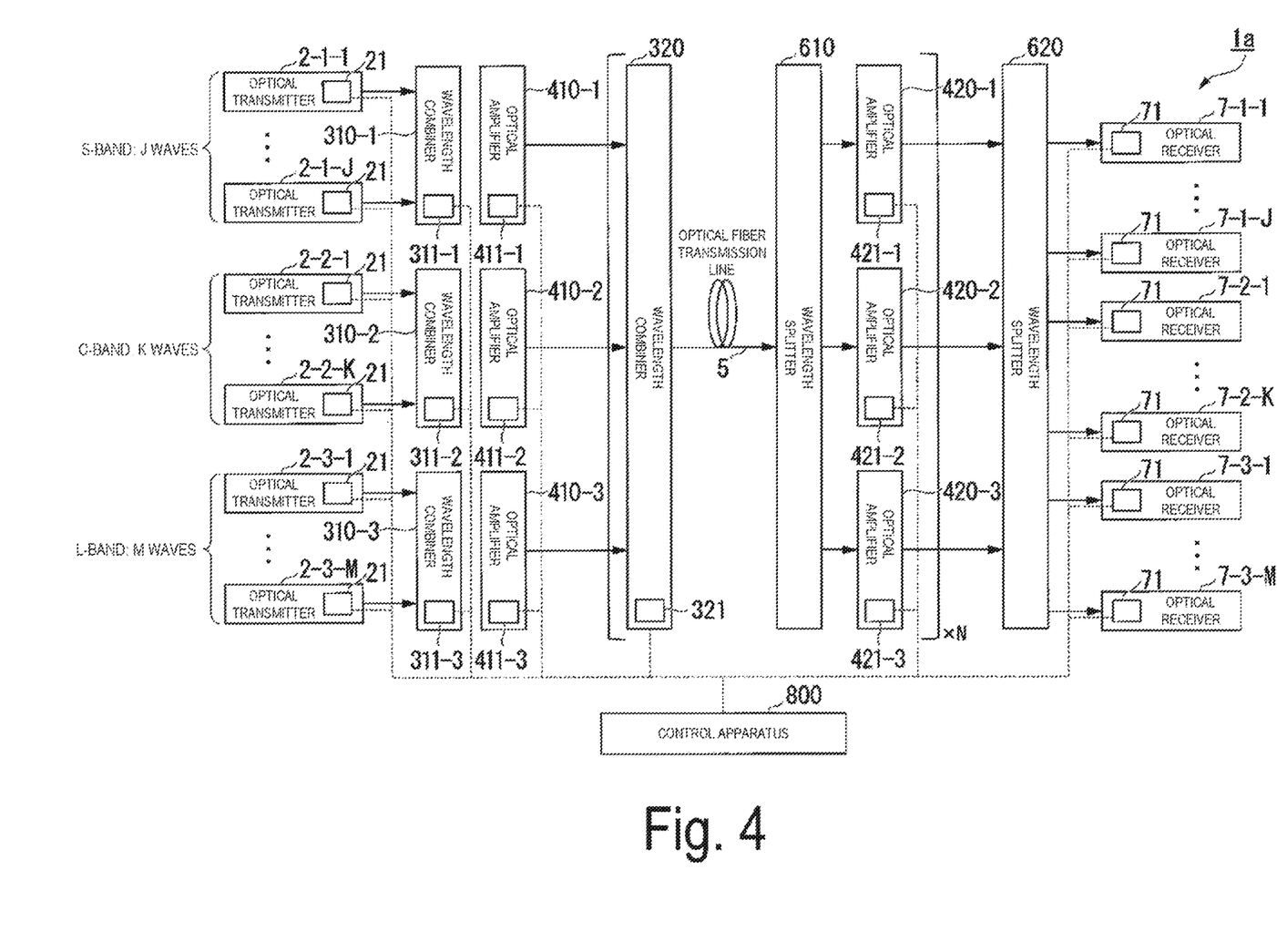
FIG. 4 is a diagram illustrating another exemplary configuration of the optical transmission system according to the embodiment.

FIG. 4 is a diagram illustrating an exemplary configuration of an optical transmission system 1a. In FIG. 4, the same parts as those of the optical transmission system 1 shown in FIG. 1 are given the same reference signs and descriptions thereof are omitted. The optical transmission system 1a shown in FIG. 4 is configured to amplify light of each band. Having an optical amplifier for each band enables fine adjustment for each band.

The optical transmission system 1a shown in FIG. 4 includes optical transmitters 2-1-1 to 2-3-M, wavelength combiners (wavelength multiplexers) 310-1 to 310-3, optical amplifiers 410-1 to 410-3, wavelength combiners (wavelength multiplexers) 320, wavelength splitters (wavelength demultiplexers) 610, optical amplifiers 420-1 to 420-3, wavelength splitter (wavelength demultiplexers) 620, optical receivers 7-1-1 to 7-3-M, and a control apparatus 800. The optical transmission system 1a includes N sets of a wavelength combiner 320, a wavelength splitter 610, and optical amplifiers 420-1 to 420-3 (where N is an integer of 1 or more).

The wavelength combiner 310-1 combines optical signals of J waves of different wavelengths transmitted by the S-band optical transmitters 2-1-1 to 2-1-J and outputs a wavelength division multiplexed optical signal obtained through the multiplexing. The wavelength combiner 310-2 multiplexes optical signals of K waves of different wavelengths transmitted by the C-band optical transmitters 2-2-1 to 2-2-K and outputs a wavelength division multiplexed optical signal obtained through the multiplexing. The wavelength combiner 310-3 multiplexes optical signals of M waves of different wavelengths transmitted by the L-band optical transmitters 2-3-1 to 2-3-M and outputs a wavelength division multiplexed optical signal obtained through the multiplexing.

The optical amplifier 410-1 amplifies and outputs the wavelength division multiplexed optical signal of the S-band output from the wavelength combiner 310-1. The optical amplifier 410-2 amplifies and outputs the wavelength division multiplexed optical signal of the C-band output from the wavelength combiner 310-2. The optical amplifier 410-3 amplifies and outputs the wavelength division multiplexed optical signal of the L-band output from the wavelength combiner 310-3.

Each wavelength combiner 320 multiplexes wavelength division multiplexed optical signals output from the optical amplifiers 410-1 to 410-3 immediately upstream of the wavelength combiner 320 or wavelength division multiplexed optical signals output from optical amplifiers 420-1 to 420-3 immediately upstream of the wavelength combiner 320. The wavelength combiner 320 outputs a wavelength division multiplexed optical signal obtained through the multiplexing to a wavelength splitter 610 immediately downstream of the wavelength combiner 320 via an optical fiber transmission line 5.

Each wavelength splitter 610 receives a wavelength division multiplexed optical signal output from a wavelength combiner 320 immediately upstream of the wavelength splitter 610 through an optical fiber transmission line 5 and demultiplexes the wavelength division multiplexed optical signal into the S-, M-, and L-bands. The wavelength splitter 610 outputs the wavelength division multiplexed optical signal of the S-band to an optical amplifier 420-1 immediately downstream of the wavelength splitter 610, the wavelength division multiplexed optical signal of the C-band to an optical amplifier 420-2 immediately downstream of the wavelength splitter 610, and the wavelength division multiplexed optical signal of the L-band to an optical amplifier 420-3 immediately downstream of the wavelength splitter 610.

The optical amplifier 420-1 amplifies the wavelength division multiplexed optical signal of the S-band output from the wavelength splitter 610 and outputs the amplified signal to a wavelength combiner 320 or the wavelength splitter 620 immediately downstream of the optical amplifier 420-1. The optical amplifier 420-2 amplifies the wavelength division multiplexed optical signal of the C-band output from the wavelength splitter 610 and outputs the amplified signal to a wavelength combiner 320 or the wavelength splitter 620 immediately downstream of the optical amplifier 420-2. The optical amplifier 420-3 amplifies the wavelength division multiplexed optical signal of the S-band output from the wavelength splitter 610 and outputs the amplified signal to a wavelength combiner 320 or the wavelength splitter 620 immediately downstream of the optical amplifier 420-3.

The wavelength splitter 620 receives the wavelength division multiplexed optical signals output from the optical amplifiers 420-1 to 420-3 immediately upstream of the wavelength splitter 620. The wavelength splitter 620 demultiplexes the wavelength division multiplexed optical signal of the S-band output from the optical amplifier 420-1 into J waves and outputs the demultiplexed optical signals of the wavelengths respectively to the corresponding optical receivers 7-1-1 to 7-1-J for receiving optical signals of the wavelengths. The wavelength splitter 620 demultiplexes the wavelength division multiplexed optical signal of the C-band output from the optical amplifier 420-2 into K waves and outputs the demultiplexed optical signals of the wavelengths respectively to the corresponding optical receivers 7-2-1 to 7-2-K for receiving optical signals of the wavelengths. The wavelength splitter 620 demultiplexes the wavelength division multiplexed optical signal of the L-band output from the optical amplifier 420-3 into M waves and outputs the demultiplexed optical signals of the wavelengths respectively to the corresponding optical receivers 7-3-1 to 7-3-M for receiving optical signals of the wavelengths.

The control apparatus 800 performs the process of FIG. 2 or 3 to perform the processing of optimizing the input power of each band to the optical fiber transmission line 5. However, input power adjuster controlled by the control apparatus 800 includes at least one of the optical power adjustment functional units 21 included in the optical transmitters 2, gain adjusters 311-$i$ included in the wavelength combiners 310-$i$, gain adjusters 411-$i$ included in the optical amplifiers 410-$i$, gain adjusters 321 included in the wavelength combiners 320, and gain adjusters 421-$i$ included in the optical amplifiers 420-$i$ (where i=1, 2, 3). The gain adjuster 311-$i$ has a function of adjusting the gain of a wavelength division multiplexed signal input to the wavelength combiner 310-$i$. The gain adjuster 411-$i$ has a function of adjusting the gain of a wavelength division multiplexed signal input to the optical amplifier 410-$i$. The gain adjuster 321 has a function of performing variable gain adjustment for each band. The gain adjuster 421-$i$ has a function of adjusting the gain of a wavelength division multiplexed signal input to the optical amplifier 420-$i$.

The input power adjuster of each band in the optical transmission system 1 of FIG. 4 is as follows. That is, the S-band input power adjuster includes at least one of the optical power adjustment functional units 21 included in the optical transmitters 2-1-1 to 2-1-J, the gain adjuster 311-1 included in the wavelength combiner 310-1, the gain adjuster 411-1 included in the optical amplifier 410-1, the gain adjusters 321 included in the wavelength combiners 320, and the gain adjusters 421-1 included in the optical amplifiers 420-1. The C-band input power adjuster includes at least one of the optical power adjustment functional units 21 included in the optical transmitters 2-2-1 to 2-2-K, the gain adjuster 311-2 included in the wavelength combiner 310-2, the gain adjuster 411-2 included in the optical amplifier 410-2, the gain adjusters 321 included in the wavelength combiners 320, and the gain adjusters 421-2 included in the optical amplifiers 420-2. The L-band input power adjuster includes at least one of the optical power adjustment functional units 21 included in the optical transmitters 2-3-1 to 2-3-M, the gain adjuster 311-3 included in the wavelength combiner 310-3, the gain adjuster 411-3 included in the optical amplifier 410-3, the gain adjusters 321 included in the wavelength combiners 320, and the gain adjusters 421-3 included in the optical amplifiers 420-3.

The optical transmitters 2 may not include the optical power adjustment functional units 21 in the case where the optical transmitters 2 do not perform power adjustment of output signals, the wavelength combiners 310-$i$ may not include the gain adjuster 311-$i$ in a case where the wavelength combiner 310-$i$ do not perform gain adjustment, the optical amplifier 410-$i$ may not include the gain adjuster 411-$i$ in a case where the optical amplifier 410-$i$ do not perform gain adjustment, the wavelength combiner 320 may not include the gain adjuster 321 in a case where the wavelength combiners 320 do not perform gain adjustment, and the optical amplifier 420-$i$ may not include the gain adjuster 421-$i$ in a case where the optical amplifier 420-$i$ do not perform gain adjustment.

According to the embodiments described above, an optical transmission system that transmits a multiplexed optical signal in which light in different wavelength bands is multiplexed includes optical transmitters, optical receivers, and a controller. The optical transmitters transmit optical signals to be multiplexed in a multiplexed optical signal. The optical receivers receive optical signals into which the multiplexed optical signal is demultiplexed. The controller is, for example, the control apparatus 8 or 800. The controller repeatedly performs an adjustment process for adjusting the powers of optical signals of frequency bands to be adjusted while switching the frequency bands to be adjusted. Here, the frequency bands to be adjusted mean some or all of a plurality of frequency bands including at least a frequency band where stimulated Raman scattering occurs among frequency bands multiplexed in a multiplexed optical signal transmitted by the optical transmission system. The adjustment process is, for example, the optimization process shown in FIG. 2 or 3. This makes it possible to optimize the input power of each wavelength to the optical fiber transmission line that transmits a wideband wavelength division multiplexed optical signal.

In the adjustment process, when the power of an optical signal of each frequency band to be adjusted transmitted from the optical transmitter has been changed, the power of the optical signal of the frequency band to be adjusted is determined based on a signal quality measured by an optical receiver that has received the optical signal. This makes it possible to determine optimal optical powers of the frequency bands multiplexed in the multiplexed optical signal.

The controller may perform the adjustment process on a plurality of frequency bands excluding a frequency band where stimulated Raman scattering does not occur, using the plurality of frequency bands as frequency bands to be adjusted. This makes it possible to quickly adjust the power of an optical signal of each frequency band where stimulated Raman scattering occurs.

The controller may cause the optical transmission system to transmit an optical signal of only one frequency band to perform an adjustment process and determine an initial value of the power of the optical signal of the frequency band. This makes it possible to quickly adjust the power of an optical signal of each frequency band.

Each of the control apparatuses 8 and 800 includes a central processing unit (CPU), a memory, an auxiliary storage device, or the like connected through a bus and functions as described above by executing an optimization processing program. Some or all of the functions of each of the control apparatuses 8 and 800 may be provided using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, or a CD-ROM, or a storage device such as a hard disk built in a computer system. The optimization processing program may also be transmitted via an electric communication line.

Although embodiments of the present invention have been described above in detail with reference to the drawings, the specific configurations thereof are not limited to those of the embodiments and also include designs or the like without departing from the spirit of the present invention.

INDUSTRIAL APPLICABILITY

The present invention is applicable to an optical transmission system that performs wavelength division multiplexing transmission in which optical signals of wavelengths where stimulated Raman scattering occurs are multiplexed.

REFERENCE SIGNS LIST

1 Optical transmission system
1a Optical transmission system
2-1-1 to 2-1-J, 2-2-1 to 2-2-K, 2-3-1 to 2-3-M Optical transmitter
3 Wavelength combiner
4 Optical amplifier
5 Optical fiber transmission line
6 Wavelength splitter
7-1-1 to 7-1-J, 7-2-1 to 7-2-K, 7-3-1 to 7-3-M Optical receiver
8 Control apparatus
21 Optical power adjustment functional unit
31 Gain adjuster
41 Gain adjuster
71 Quality measuring unit
310-1 to 310-3 Wavelength combiner
311-1 to 311-3 Gain adjuster
320 Wavelength combiner
321 Gain adjuster
410-1 to 410-3 Optical amplifier
411-1 to 411-3 Gain adjuster
420-1 to 420-3 Optical amplifier
421-1 to 421-3 Gain adjuster
610 Wavelength splitter
620 Wavelength splitter
800 Control apparatus

The invention claimed is:

1. An optical transmission control method for controlling an optical transmission system in which a plurality of optical signals of respective frequency bands are multiplexed in a multiplexed optical signal, the optical transmission control method comprising repeatedly performing an adjustment process for each of the plurality of the optical signals, the adjustment process including:
   setting one of the plurality of the optical signals of respective frequency bands as an optical signal to be adjusted;
   transmitting the multiplexed optical signal with changing optical power of the optical signal to be adjusted;
   receiving the optical signal to be adjusted which has been demultiplexed from the multiplexed optical signal and measuring a signal quality of the optical signal to be adjusted which has been received; and
   selecting the optical power which makes the optical signal to be adjusted to have highest quality as an optimum optical power of the one of the plurality of the optical signals of respective frequency bands which has been set as the optical signal to be adjusted.

2. The optical transmission control method according to claim 1, the adjustment process is performed for each of the optical signals of the respective frequency bands excluding an optical signal of a frequency band where an effect of stimulated Raman scattering is less subject among the plurality of the optical signals of the respective frequency bands as the optical signal to be adjusted.

3. The optical transmission control method according to claim 1, the optical transmission system transmits the multiplexed optical signal including only one of the optical signals of only one of frequency bands to perform the adjustment process and determining an initial optical power of the one of the plurality of the optical signals of respective frequency bands which has been set as the optical signal to be adjusted.

4. An optical transmission system in which a plurality of optical signals of respective frequency bands are multiplexed in a multiplexed optical signal, the optical transmission system comprising a controller configured to repeatedly perform an adjustment process for each of the plurality of the optical signals, the adjustment process including:
   setting one of the plurality of the optical signals of respective frequency bands as an optical signal to be adjusted;
   transmitting the multiplexed optical signal with changing optical power of the optical signal to be adjusted;
   receiving the optical signal to be adjusted which has been demultiplexed from the multiplexed optical signal and measuring a signal quality of the optical signal to be adjusted which has been received; and
   selecting the optical power which makes the optical signal to be adjusted to have highest quality as an optimum optical power of the one of the plurality of the optical signals of respective frequency bands which has been set as the optical signal to be adjusted.

5. The optical transmission system according to claim 4, wherein the adjustment process is performed for each of the optical signals of the respective frequency bands excluding an optical signal of a frequency band where an effect of stimulated Raman scattering is less subject among the plurality of the optical signals of the respective frequency bands as the optical signal to be adjusted.

6. The optical transmission system according to claim 4, wherein the optical transmission system transmits the multiplexed optical signal including only one of the optical signals of only one of frequency bands to perform the adjustment process and determining an initial optical power of the one of the plurality of the optical signals of respective frequency bands which has been set as the optical signal to be adjusted.

* * * * *